United States Patent
Hoagland (10) Patent No.: US 12,332,841 B1
(45) Date of Patent: Jun. 17, 2025

(54) MACHINE LEARNING BASED AUGMENTATION OF GENERATIVE ARTIFICIAL INTELLIGENCE SYSTEMS

(71) Applicant: IntelliGenetiX Technologies LLC (iGTX), Rio Rancho, NM (US)

(72) Inventor: Patrick Edward Hoagland, Springfield, MN (US)

(73) Assignee: IntelliGenetiX Technologies LLC (iGTX), NE Rio Rancho, NM (US)

( * ) Notice: Subject to any disclaimer, the term of this patent is extended or adjusted under 35 U.S.C. 154(b) by 0 days.

(21) Appl. No.: 19/069,558

(22) Filed: Mar. 4, 2025

(51) Int. Cl.
  *G06F 16/14* (2019.01)
  *G06F 16/16* (2019.01)
  *G06N 20/00* (2019.01)
(52) U.S. Cl.
  CPC .......... *G06F 16/148* (2019.01); *G06F 16/16* (2019.01); *G06N 20/00* (2019.01)
(58) Field of Classification Search
  CPC ....... G06N 20/00; G06F 16/16; G06F 16/148; G06F 40/30; G06F 40/35
  See application file for complete search history.

(56) References Cited

U.S. PATENT DOCUMENTS

| | | | |
|---|---|---|---|
| 2024/0414108 A1* | 12/2024 | Sun | H04L 51/216 |
| 2025/0021768 A1* | 1/2025 | Madan | G06F 40/20 |
| 2025/0094466 A1* | 3/2025 | Grover | G06F 16/3344 |

OTHER PUBLICATIONS

Hou et al., "My agent understands me better: Integrating Dynamic Human-like Memory Recall and Consolidation in LLM-Based Agents," CoRR, Submitted on Mar. 31, 2024, arXiv:2404.00573v1, 7 pages.
ischool.berkeley.edu [online], "LLM4LLM: Longer-Lasting Memory for LLMs," Aug. 13, 2024, retrieved on Mar. 12, 2025, retrieved from URL <https://www.ischool.berkeley.edu/projects/2024/llm4llm-longer-lasting-memory-llms>, 7 pages.
research.ibm.com [online], "How memory augmentation can improve large language model efficiency and flexibility," Sep. 24, 2024, retrieved on Mar. 12, 2025, retrieved from URL <https://research.ibm.com/blog/memory-augmented-LLMs>, 6 pages.
Zhong et al., "MemoryBank: Enhancing Large Language Models with Long-Term Memory," CoRR, Submitted on May 21, 2023, arXiv:2305.10250v3, 11 pages.

* cited by examiner

*Primary Examiner* — Hau H Hoang
(74) *Attorney, Agent, or Firm* — Fish & Richardson P.C.

(57) ABSTRACT

Technology embodied in a method that includes receiving, as an input to a machine-learning model, data indicative of user-interaction of a particular user with a generative artificial intelligence (AI) system. The machine learning model is trained to identify one or more topics associated with inputs provided to the machine-learning model. The method also includes identifying a first context associated with the data indicative of the user-interaction with the generative AI system, and parsing a file system to determine that one or more folders within the file system correspond to the first context. The file system includes multiple folders each corresponding to a separate topic as identified from historical interactions of the particular user with the generative AI system. The data indicative of the interaction is augmented and provided to the generative AI system for generation of a response to the interaction.

21 Claims, 4 Drawing Sheets

MACHINE LEARNING BASED AUGMENTATION OF GENERATIVE ARTIFICIAL INTELLIGENCE SYSTEMS

TECHNICAL FIELD

This specification relates to artificial intelligence (AI) systems such as AI-based conversational systems.

BACKGROUND

Generative AI systems have garnered considerable attention due to their capability to produce coherent and contextually relevant outputs. These systems are highly valuable in various applications, including natural language processing, content creation, and automated customer service. The advancements in generative AI have facilitated the development of sophisticated conversational agents that can understand and respond to user inputs in a natural and intuitive manner. These systems leverage a combination of natural language processing, machine learning, and deep learning technologies, enabling them to perform a wide range of tasks, from simple queries to complex problem-solving.

SUMMARY

In one aspect, the technology described herein is embodied in a method that includes receiving, as an input to a machine-learning model, data indicative of user-interaction of a particular user with a generative artificial intelligence (AI) system. The machine learning model is trained to identify one or more topics associated with inputs provided to the machine-learning model. The method also includes identifying, by the machine-learning model based on the input, a first context associated with the data indicative of the user-interaction with the generative AI system, and parsing a file system accessible to the machine-learning model to determine that one or more folders within the file system correspond to the first context. The file system includes multiple folders each corresponding to a separate topic as identified by the machine-learning model from historical interactions of the particular user with the generative AI system, wherein each of the one or more folders stores information related to the corresponding topic as extracted by the machine-learning model from corresponding portions of the historical interactions. In response to determining that the one or more folders within the file system correspond to the first context, the data indicative of the interaction is augmented based on corresponding information from the one or more folders to generate an augmented prompt for the generative AI system, and the augmented prompt is provided to the generative AI system for the generative AI system to generate a response to the interaction.

In another aspect, this document describes one or more non-transitory machine-readable storage devices storing machine-readable instructions configured to cause one or more processing devices to perform various operations. The operations include receiving, as an input to a machine-learning model, data indicative of user-interaction of a particular user with a generative artificial intelligence (AI) system. The machine learning model is trained to identify one or more topics associated with inputs provided to the machine-learning model. The operations also include identifying, by the machine-learning model based on the input, a first context associated with the data indicative of the user-interaction with the generative AI system, and parsing a file system accessible to the machine-learning model to determine that one or more folders within the file system correspond to the first context. The file system includes multiple folders each corresponding to a separate topic as identified by the machine-learning model from historical interactions of the particular user with the generative AI system, wherein each of the one or more folders stores information related to the corresponding topic as extracted by the machine-learning model from corresponding portions of the historical interactions. In response to determining that the one or more folders within the file system correspond to the first context, the data indicative of the interaction is augmented based on corresponding information from the one or more folders to generate an augmented prompt for the generative AI system, and the augmented prompt is provided to the generative AI system for the generative AI system to generate a response to the interaction.

In another aspect, this document describes a system that includes memory configured to store machine-readable instructions, and one or more processing devices configured to execute the machine-readable instructions to perform various operations. The operations include receiving, as an input to a machine-learning model, data indicative of user-interaction of a particular user with a generative artificial intelligence (AI) system. The machine learning model is trained to identify one or more topics associated with inputs provided to the machine-learning model. The operations also include identifying, by the machine-learning model based on the input, a first context associated with the data indicative of the user-interaction with the generative AI system, and parsing a file system accessible to the machine-learning model to determine that one or more folders within the file system correspond to the first context. The file system includes multiple folders each corresponding to a separate topic as identified by the machine-learning model from historical interactions of the particular user with the generative AI system, wherein each of the one or more folders stores information related to the corresponding topic as extracted by the machine-learning model from corresponding portions of the historical interactions. In response to determining that the one or more folders within the file system correspond to the first context, the data indicative of the interaction is augmented based on corresponding information from the one or more folders to generate an augmented prompt for the generative AI system, and the augmented prompt is provided to the generative AI system for the generative AI system to generate a response to the interaction.

Implementations of the above aspects can include one or more of the following features. The method or the operations can include receiving, as a feedback to the machine-learning model, a portion of the response generated by the generative AI system, identifying, by the machine-learning model based on the feedback, a second context associated with the response, and storing information extracted from the portion of the response in a corresponding folder for the second context within the file system. Storing the information in the corresponding folder for the second context can include determining that the file system includes a particular folder for a context that substantially matches the second context, and identifying the particular folder as the corresponding folder for the second context. Storing the information in the corresponding folder for the second context can include determining that the file system does not include a folder for a context which substantially matches the second context, and in response creating a new folder within the file system as the corresponding folder for the second context.

The file system can be configured to store the historical interactions corresponding to a predetermined time window. The method or the operations can include receiving user-input indicative of particular interest in a portion of the response generated by the generative AI system, identifying, by the machine-learning model based on the user-input, a second context associated with the response, and storing information extracted from the portion of the response in a corresponding folder for the second context within the file system. The method or the operations can include receiving user-input indicative of lack of interest in a portion of the response generated by the generative AI system, identifying, by the machine-learning model based on the response, a second context associated with the response, and storing information extracted from the response in a corresponding folder for the second context within the file system. The stored information can be indicative of the lack of interest in the portion as represented in the user-input. The stored information can exclude information pertaining to the portion of the response or include an indication of the lack of interest in the portion of the response.

Augmenting the data indicative of the interaction based on corresponding information from the one or more folders to generate an augmented prompt for the generative AI system can include using a script to extract the corresponding information from the one or more folders, providing the corresponding information and data indicative of the interaction to a second generative AI system using an application programming interface (API), and generating, by the second generative AI system, the augmented prompt based on the corresponding information and data indicative of the interaction. The second generative AI system can be the same as the first generative AI system. Augmenting the data indicative of the interaction based on corresponding information from the one or more folders to generate an augmented prompt for the generative AI system can include adding to the data indicative of the interaction a description of one or more historical interactions of the particular user with the generative AI system. The one or more historical interactions can be related to the first context identified by the machine learning model. One or more folders of the file system can store data related to characteristics of the particular user, and augmenting the data indicative of the interaction can include adding to the data indicative of the interaction the data related to characteristics of the particular user.

BRIEF DESCRIPTION OF THE DRAWINGS

Like reference numbers and designations in the various drawings indicate like elements.

DETAILED DESCRIPTION

This specification describes technology for enhancing user-interactions with a generative artificial intelligence (AI) system, for example, by augmenting prompts based on historical interactions of the user with the generative AI system. In some implementations, the technology described herein provides an interaction platform/interface that utilizes a machine learning (ML) model to continuously learn from interactions between a user and the generative AI system, such that the ML model can be used to automatically enhance/augment prompts from the user to provide highly relevant results that are specifically contextualized/personalized for the particular user. As such, the platform/interface can provide for a collaborative system where outputs of the generative AI system are interpreted and/or potentially enhanced based on the user's knowledge—thereby providing for improved generative AI systems.

In some implementations, the ML model can be trained to process interactions of a user with a generative AI system to associate a given user-input (or set of interactions) with a context. The context can be stored in a database or otherwise in an organized fashion, for example, within a folder in a file system storing folders each corresponding to a separate topic and storing information related to the corresponding topic. Information stored in a given folder can be obtained, for example, from the particular user's historical interactions with the generative AI system related to the corresponding topic. As such, once a current input/interaction is mapped to a particular context for which a folder exists within the file system/database, the stored information can be used to augment the user-input to produce an augmented prompt that potentially adds contextual relevance of the user-input. When such an augmented prompt is provided to the generative AI system, the generated output can be potentially significantly enhanced as compared to those generated by the non-augmented version of the user-input.

The augmented prompt can include information that automatically provides additional context to the user-input or interactions. For example, consider an interaction between a user and a generative AI chatbot to converge on a recipe for a particular dish. The ML model can be configured to process the interactions to identify the context as that being about a recipe, and information extracted from the interactions—such as certain preferences of the user about ingredients (e.g., vegan components only) or taste (e.g., not too spicy) etc.—can be stored within a folder or database. When the user interacts with the chatbot about a recipe for the same/similar dish again at a later time and/or in a completely different session, the ML model can be configured to process the interactions to automatically identify the context, and retrieve relevant information from the database/file system to augment the prompts/interactions with the information stored therein. This in turn can result in efficient communications that could potentially save interaction-time as well as computational resources to converge on an answer/output that would be satisfactory to the user. In addition, user-feedback on the answers/outputs can be used to retrain the ML model such that the model keeps updating, thereby providing for enhanced and relevant interactions with the generative AI system.

Figure 1:
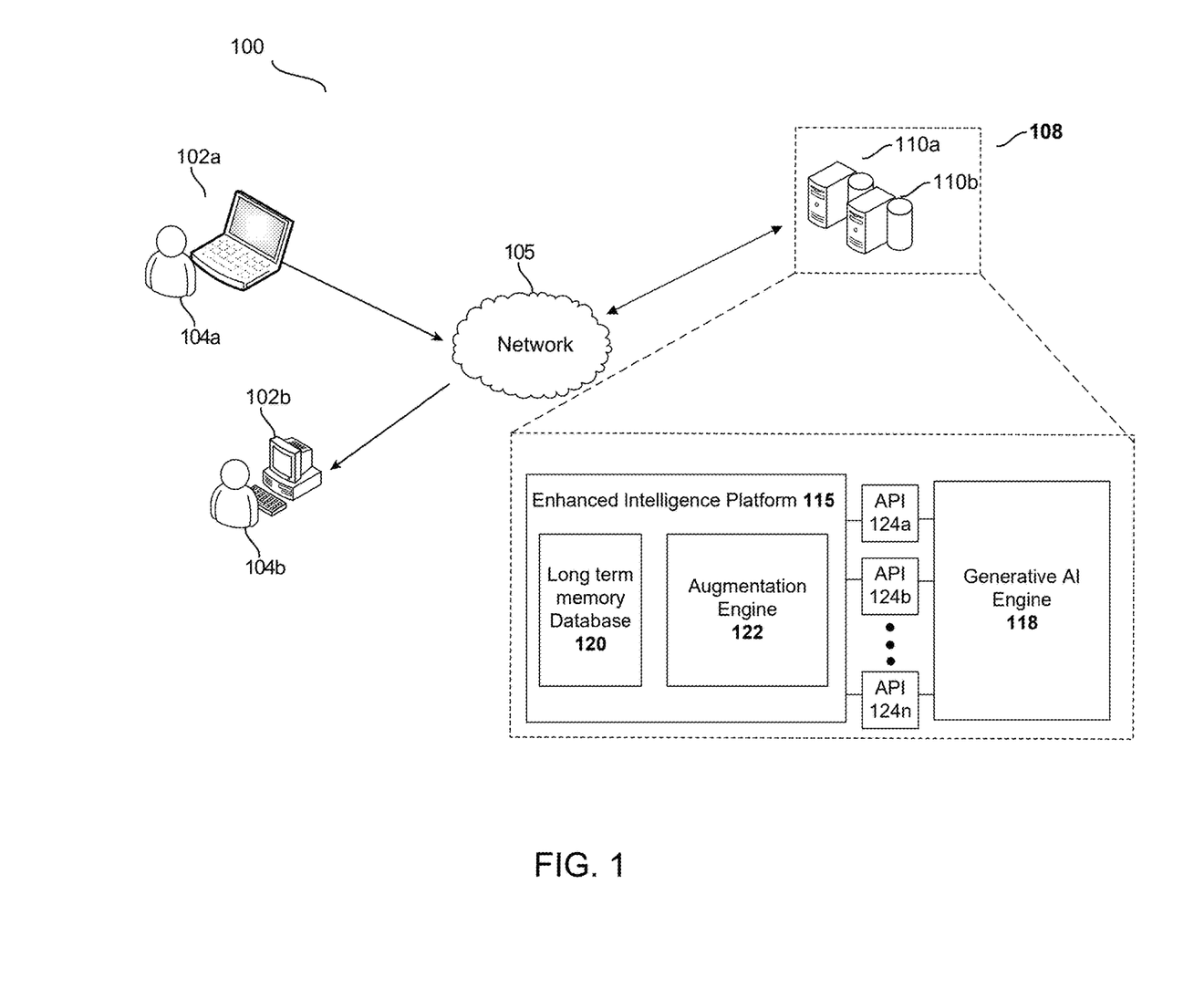
FIG. 1 is a block diagram of an example system implementing the technology described herein.

FIG. 1 is a block diagram of an example system 100 for implementing the technology described herein. The system 100 shows users 104a, 104b (104, in general) with corresponding user-devices 102a, 102b, respectively (102, in general) interacting with a remote system 108 over a network 105. In some implementations, the remote system 108 can include one or more server systems 110a, 110b (110, in general) implementing the technology described herein. For example, the technology can be provided through an enhanced intelligence platform 115 that is in communication with a generative AI system such as the generative AI engine 118. The enhanced intelligence platform 115 can reside on a server system 110*a*, whereas the generative AI engine can reside in a separate server system 110*b*. The server systems 110*a* and 110*b* can be remote to one another and communicate with one another over a network such as the network 105.

In some implementations, the enhanced intelligence platform 115 can be implemented on an edge device within the premises of an entity subscribing to the enhanced intelligence platform 115. This can allow for the security for the enhanced intelligence platform 115 to be provided from within the premises. For example, the enhanced intelligence platform 115 can be configured to reside behind a firewall and/or operate within a trusted execution environment (TEE) such that machine-learning models within the enhanced intelligence platform 115 can be securely trained with potentially sensitive user-data, and/or user-data can be securely stored within the confines of such firewall and/or TEE.

The enhanced intelligence platform 115 can be configured to communicate with the generative AI engine 118 through one or more application programming interfaces (APIs) 124*a*, 124*b*, . . . , 124*n* (124, in general). The generative AI engine 118 can include a generative AI conversational system such as an AI-powered chatbot. In some implementations, the generative AI engine 118 can be a publicly available system such as ChatGPT® developed by OpenAI, Inc., Copilot® developed by Microsoft Corporation, or Gemini® developed by Google LLC. In some implementations, the generative AI engine 118 can be an enterprise tool developed specifically for the use of particular entities.

In some implementations, the generative AI engine 118 can be powered by various other technologies that collectively enable the systems to understand, process, and generate human-like responses, thereby facilitating natural and intuitive interactions. For example, such as system can utilize Natural Language Processing (NLP), which allows the system to comprehend and interpret human language. In some implementations, NLP encompasses tasks such as tokenization, parsing, and sentiment analysis, which can be used for interpreting various nuances of user inputs.

The generative AI engine 118 can employ ML algorithms to enable learning from extensive datasets, thereby enhancing/improving responses over time. Various learning approaches such as supervised learning, unsupervised learning, and reinforcement learning can be used in the ML algorithms. In some implementations, deep learning—which utilizes neural networks with multiple layers to model intricate patterns in data—can be used for tasks like language modeling and speech recognition, allowing the system to generate coherent and contextually relevant outputs.

The generative AI engine 118 can be configured to use various types of hardware architecture. In some implementations, the generative AI engine 118 uses a transformer architecture such as a generative pre-trained transformer (GPT). In some implementations, transformers can be configured to implement self-attention mechanisms to process input data in parallel, making them highly efficient and effective for language-related tasks. In some implementations, the generative AI engine 118 can include voice-processing modules such as automatic speech recognition (ASR) and text-to-speech (TTS) modules. ASR converts spoken language into text, while TTS systems generate spoken responses, enabling seamless voice interactions. In some implementations, the generative AI engine 118 can include a dialogue management module configured to manage a flow of conversation. A dialogue management module can be configured to maintain context and coherence throughout the interaction, thereby providing a smooth and engaging user experience. The various modules and subsystems of the generative AI engine 118 can be configured to work together synergistically to implement various sophisticated AI assistants capable of performing a wide range of tasks, from answering simple queries to solving complex problems.

In some implementations, the enhanced intelligence platform 115 can be configured to enhance the effectiveness and efficiency of the generative AI engine 118. For example, the enhanced intelligent platform 115 can be configured to include a long-term memory database 120 that stores information pertaining to prior interactions of users with the generative AI engine 118. In some implementations, an augmentation engine 122 can be configured to intercept user interactions with the generative AI engine 118 and augment/enhance the interactions based on information stored in the long term memory database 120 to facilitate highly relevant and contextualized responses from the generative AI engine 118. For example, the augmentation engine 122 can include one or more ML models that can be configured to parse user-interactions with the generative AI engine 118 and store user-specific context information categorized by different topics. When a new interaction/input is intercepted by the augmentation engine 122, a context relevant to the new interaction can be identified, and corresponding information may be retrieved by the augmentation engine to enhance the new interaction/input such that the enhanced interaction/input increases the likelihood of production of contextual/relevant information by the generative AI engine 118.

The enhanced intelligence platform 115 can be configured to interface with the generative AI engine 118 using one or more application programming interfaces (APIs) 124*a*, 124*b*, . . . , 124*n* (124, in general). In some implementations, the APIs 124 can be configured to intercept/obtain—with appropriate permissions from users—user-interactions with the generative AI engine 118 such that the user-interactions can be used to train one or more ML models of the augmentation engine 122 and/or can be parsed by the augmentation engine to be enhanced for improved communications with the generative AI engine 118. In some implementations, one or more of the APIs 124 can be used to pass enhanced inputs/interactions (e.g., adjusted prompts) back to the generative AI engine 118. Examples of the APIs 124 can include representational state transfer (REST) APIs in accordance with OpenAPI specifications, GPT 3.5 Turbo APIs and Whisper APIs provided by OpenAI, Inc., and Gemini APIs provided by Google LLC, and/or other proprietary or non-proprietary APIs compatible with the corresponding generative AI engine 118.

In some implementations, one or more of the APIs 124 can be used by the enhanced intelligence platform 115 to access a generative AI engine (whether the generative AI engine 118 or another generative AI engine) to enhance a given user input or interaction. For example, the augmentation engine 122 can retrieve information from the long term memory database 120 and provide the same to a generative AI engine to generate a new prompt from an existing prompt and the retrieved information. The new prompt can then be fed back to the generative AI engine 118 for generation of a response based on the new prompt.

As such, by intelligently tracking and storing user-interactions in the long term memory database 120 and using the stored information by the augmentation engine 122 to enhance interactions/inputs, the enhanced intelligence platform 115 provides for technology that allows for collaborative uses of the generative AI engine. Such collaborative uses can account for user-preferences, user-intelligence, and potentially even user-emotions to generate outputs that are significantly more context aware as compared to those generated without the benefit of the enhancements described herein. By tracking/storing and updating extracted context and user-preferences associated with same, interactions/inputs can be enhanced using information from prior interactions that may have taken place earlier—potentially several days, weeks, or even months earlier. Using machine learning models to parse user-interactions—with appropriate informed consents—and extract relevant features therefrom allows for resource-efficient storage of user-specific information. Incorporating such user-specific information in later interactions allow for efficient convergence to satisfactory and relevant results thereby potentially saving interaction-time and valuable use of computational resources.

Figure 2:
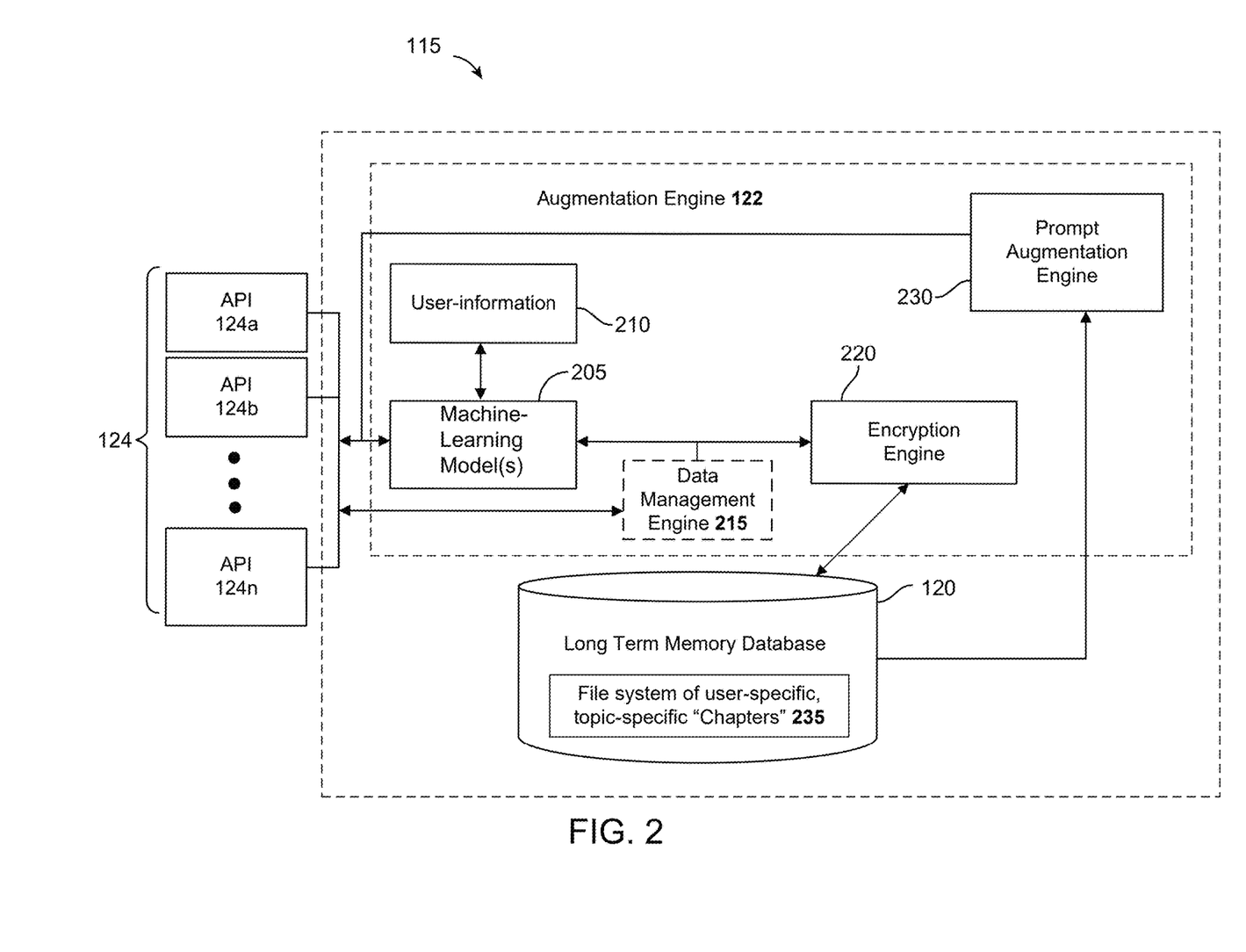
FIG. 2 is a block diagram of an example enhanced intelligence platform described with reference to FIG. 1.

FIG. 2 is a block diagram of an example enhanced intelligence platform 115 showing details of an example augmentation engine 122 and an example long-term memory database 120. The enhanced intelligence platform 115 interfaces with a generative AI engine 118 over the one or more APIs 124 as discussed with respect to FIG. 1. In some implementations, the APIs are configured to obtain/intercept user interactions between users and the generative AI engine—based on informed consent of users—and provide the same to one or more ML models 205.

The ML models 205 can be of various types that can be configured to extract information from the user-interactions. The ML models 205 can employ various techniques, including, for example, Named Entity Recognition (NER) to identify and classify entities, Topic Modeling to discover abstract topics, Text Classification for categorizing text, Word Embeddings to capture semantic relationships, Transformer Models for a range of natural language processing (NLP) tasks, and Dependency Parsing to analyze grammatical structures. These techniques, alone or in combination, can enable efficient and accurate extraction of information, providing valuable insights and facilitating diverse applications.

In some implementations, the ML models 205 can be trained using various supervised learning techniques based on labeled datasets to predict context based on input data on user-interactions captured by one or more of the APIs 124. These techniques can include, for example, linear regression for predicting continuous values, logistic regression for binary classification, and support vector machines (SVM) for class separation using hyperplanes. Additionally, decision trees and random forests can be employed for both classification and regression tasks, offering interpretable models and handling complex data structures. One or more clustering algorithms such as the k-nearest neighbors (KNN) algorithm can be used to classify data points based on their proximity to labeled points. In some implementations, neural networks, including deep learning models, can be utilized for processing large, complex datasets, making them suitable for tasks such as image and speech recognition.

The ML models can include a model for extracting and organizing information from historical user interactions. For example, data obtained by the APIs 124 can be structured by segmenting the collected data into folders based on topics/contexts identified by the same or another ML model. In some implementations, each folder can represent a distinct context identified from prior interactions. In some implementations, interaction data can be labeled with metadata, e.g., timestamps and priorities, to ensure precise retrieval. In some implementations, during preprocessing, the data can be tokenized into manageable units and normalized by converting text to lowercase, removing special characters, and correcting typos. A transformer-based architecture, such as BERT or GPT, can then be fine-tuned on the preprocessed dataset to classify inputs into specific topics. The model's performance can be optimized by monitoring metrics like precision and recall. In some implementations, the model can be evaluated using a validation dataset to ensure high accuracy in identifying relevant topics and minimizing false positives.

The ML models 205 can be trained to analyze user-interactions specific to individual users. As such, in the training phase and/or the runtime phase, the ML models 205 can be provided with user-information pertaining to the user for which the user-interactions are being processed by the ML models 205. The user information 210 can include, for example, an identification of the user, one or more user-preferences associated with the user. The user-information allows for the information extracted by the ML models 205 to be stored as user-specific folders (also referred to as "chapters") within a file system 235 in the long term memory database 120. In some implementations, the extracted information can be represented as user-specific (and topic/context-specific) embeddings which can be stored in the long-term memory database 120. In some implementations, to optimize memory use, the file system can be configured to store the historical interactions corresponding to a predetermined time window. The predetermined time window can be, for example, a month, six months, a year, or another configurable length of time selected, for example, in accordance with memory available for implementing the long term memory database 120 for one or more users.

In some implementations, the enhanced intelligence platform 115 includes a data management engine 215 that can be configured to control the flow of information from the generative AI engine 118 into the ML models 205. For example, the data management engine 215 can be configured to receive user-input indicative of particular interest in a portion of a response generated by the generative AI engine 118 (e.g., as indicated by user-input highlighting/selecting a portion of the response that is of particular interest), and pass on the relevant portion to the ML models 205 for training/processing. In some implementations, the data management engine 215 can be configured to receive user-input indicative of a lack of interest in a portion of a response generated by the generative AI engine 118 (e.g., as indicated by strikethrough, tagging etc.), and pass on the relevant portion to the ML models 205 for training/processing.

During runtime, user inputs or interactions captured by the APIs 124 can be processed using one or more ML models 205 to enhance information retrieval and response generation. For example, an incoming user input such as an input received through an API 124 can be transformed into an embedding—a vector representing the input's context/meaning—as obtained from an ML model 205. In some implementations, this embedding is then compared to stored embeddings in topic-specific folders within the file system 235 using a similarity metric such as cosine similarity. If a determination is made that the file system does not include a folder for a context which substantially matches a context identified by a ML model 205, a new folder can be created within the file system as the corresponding folder for the identified context. Cosine similarity measures the angle between two vectors and outputs a value between −1 and 1, with higher scores indicating closer contextual similarity.

Other metrics of similarity such as Euclidean distance, Hamming distance, or another suitable metric may also be used.

In some implementations, relevant data is retrieved from topic folders within the file system 235 if the similarity score exceeds a predefined threshold (e.g., >0.8). The retrieved data can be provided to a prompt augmentation engine 230 for the generation of the augmented prompt. In some implementations, the retrieved data can be split into smaller chunks, each maintaining contextual links to both previous and subsequent chunks. These chunks can then be combined with the new user input to create a fully augmented prompt, with recent and high-priority data weighted more heavily to ensure relevance. In some implementations, the information retrieved from the file system 235 can be combined with the new input and provided by the prompt augmentation engine 230 to a generative AI system (e.g., the generative AI system 118 described with reference to FIG. 1, or another generative AI system implemented as a part of the enhanced intelligence platform) to obtain the augmented prompt. The augmented prompt can be sent via an API 124 to the generative AI engine 118 for processing, which then processes and returns the response to the user, completing the augmentation cycle.

In some implementations, the augmentation engine 122 includes an encryption engine 220 configured to implement data protection within the augmentation engine 122. The encryption engine can be configured to encrypt communications among various sub-modules and engines of the augmentation engine 122 and/or with external systems to securely exchange information. In some implementations, the encryption engine 220 can be configured to adhere to local and/or international data privacy laws and regulations, such as HIPAA, GDPR, FERPA, etc., thereby allowing for the subject technology to be used in healthcare, education, and other sectors that use personal and/or confidential data.

Figure 3:
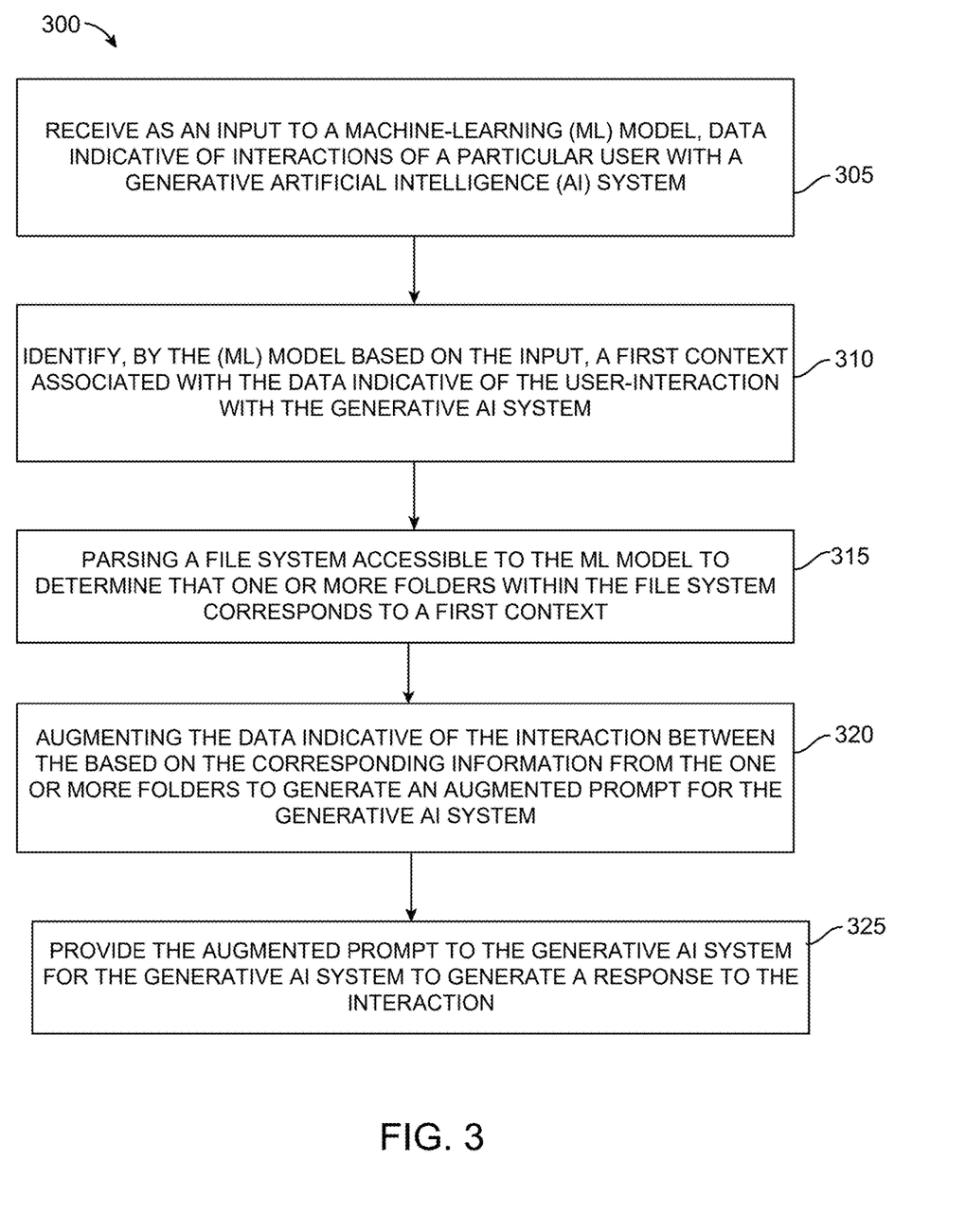
FIG. 3 is a flow diagram of an example process for implementing the technology described herein.

FIG. 3 is a flow diagram of an example process 300 for implementing the technology described herein. The process 300 can be executed, at least in part, by components of the enhanced intelligence platform 115 described above with reference to FIGS. 1 and 2, potentially in conjunction with other components of the system. Operations of the process 300 can include receiving, as an input to a ML model, data indicative of interaction of a particular user with a generative AI system, the ML model being trained to identify one or more topics associated with inputs provided to the ML model (305). The ML model can be one of the ML models 205 described above with reference to FIG. 2. The generative AI system can be one that is substantially similar to the generative AI engine 118 described above with reference to FIG. 1.

Operations of the process 300 also includes identifying, by the ML model based on the input, a first context associated with the data indicative of the user-interaction with the generative AI system (310). The first context can be identified by the ML model substantially as described above with reference to FIG. 2.

The operations also include parsing a file system accessible to the machine-learning model to determine that one or more folders within the file system correspond to the first context (315). In some implementations, the file system is substantially identical to the long-term memory database 120 described above with reference to FIGS. 1 and 2. The file system can include multiple user-specific folders each corresponding to a separate topic as identified by the ML model from historical interactions of the particular user with the generative AI system. In some implementations, each of the one or more folders stores information related to the corresponding topic as extracted by the machine-learning model from corresponding portions of the historical interactions. In some implementations, the file system is configured to store the historical interactions corresponding to a predetermined time window such as one month, six months, one year, or another configurable length of time selected, for example, in accordance with memory available for implementing the long term memory database 120 for one or more users.

Operations of the process 300 further includes, in response to determining that the one or more folders within the file system correspond to the first context, augmenting the data indicative of the interaction based on corresponding information from the one or more folders to generate an augmented prompt for the generative AI system (320). This can include, for example, adding to the data indicative of the interaction a description of one or more historical interactions of the particular user with the generative AI system. The one or more historical interactions can be related to the first context identified by the ML model. The added data can be retrieved from the long-term memory database 120 as described above with reference to FIG. 2. In some implementations, the one or more folders of the file system stores data related to characteristics of the particular user, and augmenting the data includes adding to the data indicative of the interaction the data related to characteristics of the particular user. In some implementations, augmenting the data can include using a script to extract the corresponding information from the one or more folders, providing the corresponding information and data indicative of the interaction to a generative AI system using an application programming interface (API), and generating, by the generative AI system, the augmented prompt based on the input provided.

Operations of the process 300 also includes providing the augmented prompt to the generative AI system for the generative AI system to generate a response to the interaction (325). In some implementations, a portion of the response generated by the generative AI system is received as a feedback at the ML model, and ML model identifies, based on the feedback, a second context associated with the response. For example, if the user asks a follow-up question or provides another prompt in response to the response to the original interaction, the follow-up interaction can be provided as a feedback to the ML model—enabling the ML model to learn/analyze user-preferences, emotions, feedback etc. associated with the response to the original interaction. This in turn can allow the ML model to be fine-tuned to be able to provide more contextually relevant responses in future.

In some implementations, the updates to the model and/or information extracted from the feedback can be stored in a corresponding folder either as part of a folder corresponding to an existing context, or as a second context, within the file system. For example, a determination may be made that the file system includes a particular folder for a context that substantially matches the second context, and the extracted information can be stored in the particular folder. In another example, a determination may be made that the file system does not include a folder for the second context, and in response, creating a new folder within the file system for the second context.

In some implementations, the second context can be identified based on user-input pertaining to the response generated for the first interaction. This can include, for example, receiving user-input indicative of particular interest in a portion of the response generated by the generative AI system, identifying, by the ML model based on the user-input, the second context, and storing information extracted from the portion of the response in a corresponding folder. In some implementations, this can include receiving user-input indicative of lack of interest in a portion of the response generated by the generative AI system, identifying, by the ML model based on the response, the second context, and storing information extracted from the response in a corresponding folder. The stored information in this case can be indicative of the lack of interest in the portion as represented in the user-input. For example, the stored information can exclude information pertaining to the portion of the response, or the stored information includes an indication of the lack of interest in the portion of the response.

Figure 4:
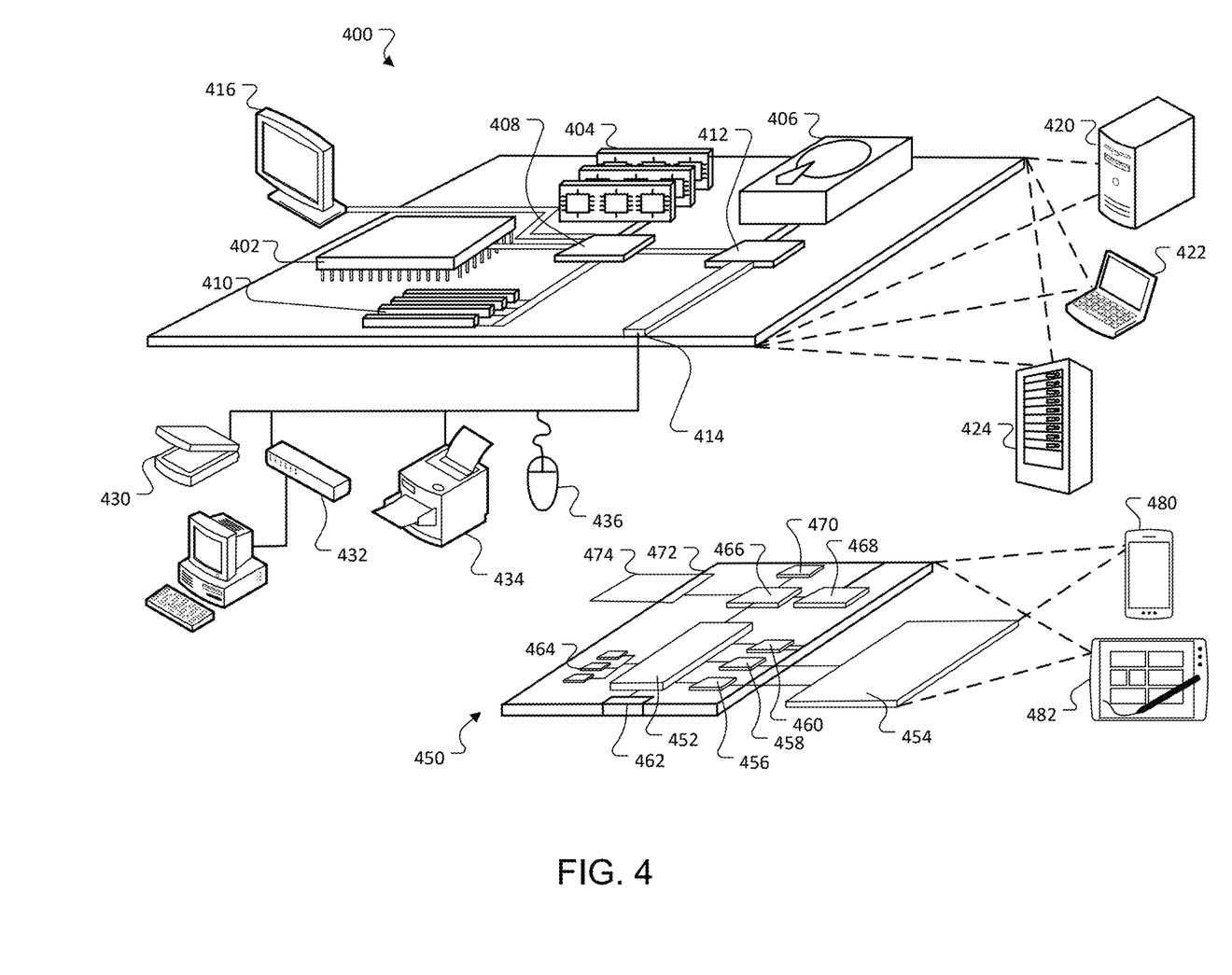
FIG. 4 is a schematic diagram of a computing device and a mobile device that can be used to implement at least a portion of the system described herein.

FIG. 4 shows an example of a computing device 400 and a mobile computing device 450 that are employed to execute implementations of the present disclosure. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting. The computing device 400 and/or the mobile computing device 450 can form at least a portion of the system 100 described above. Specifically, the computing device 400 and/or the mobile computing device 450 can form at least a portion of the enhanced intelligence platform 115 described above. In some implementations, the functions and/or entities described above can be implemented using a cloud infrastructure including multiple computing devices 400 and/or mobile computing devices 450.

The computing device 400 includes a processor 402, a memory 404, a storage device 406, a high-speed interface 408, and a low-speed interface 412. In some implementations, the high-speed interface 408 connects to the memory 404 and multiple high-speed expansion ports 410. In some implementations, the low-speed interface 412 connects to a low-speed expansion port 414 and the storage device 404. Each of the processor 402, the memory 404, the storage device 406, the high-speed interface 408, the high-speed expansion ports 410, and the low-speed interface 412, are interconnected using various buses, and may be mounted on a common motherboard or in other manners as appropriate. The processor 402 can process instructions for execution within the computing device 400, including instructions stored in the memory 404 and/or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of a computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 402, perform one or more methods, such as those described above. The instructions can also be stored by one or more storage devices, such as computer-readable or machine-readable mediums, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 414 through a network adapter. Such network input/output devices may include, for example, a switch or router.

The computing device 400 may be implemented in a number of different forms, as shown in the FIG. 4. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other.

The mobile computing device 450 includes a processor 452; a memory 464; an input/output device, such as a display 454; a communication interface 466; and a transceiver 468; among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate. In some implementations, the mobile computing device 450 may include a camera device(s).

The processor 452 can execute instructions within the mobile computing device 450, including instructions stored in the memory 464. The processor 452 may be implemented as a chipset of chips that include separate and multiple analog and digital processors. For example, the processor 452 may be a Complex Instruction Set Computers (CISC) processor, a Reduced Instruction Set Computer (RISC)

processor, or a Minimal Instruction Set Computer (MISC) processor. The processor 452 may provide, for example, for coordination of the other components of the mobile computing device 450, such as control of user interfaces (UIs), applications run by the mobile computing device 450, and/or wireless communication by the mobile computing device 450.

The processor 452 may communicate with a user through a control interface 458 and a display interface 456 coupled to the display 454. The display 454 may be, for example, a Thin-Film-Transistor Liquid Crystal Display (TFT) display, an Organic Light Emitting Diode (OLED) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a Single in Line Memory Module (SIMM) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 452, perform one or more methods, such as those described above. The instructions can also be stored by one or more storage devices, such as one or more computer-readable or machine-readable mediums, such as the memory 464, the expansion memory 474, or memory on the processor 452. In some implementations, the instructions can be received in a propagated signal, such as, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS), IP Multimedia Subsystem (IMS) technologies, and 4G technologies. Such communication may occur, for example, through the transceiver 468 using a radio frequency. In addition, short-range communication, such as using a Bluetooth or Wi-Fi, may occur. In addition, a Global Positioning System (GPS) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in FIG. 4. For example, it may be implemented as a phone device 480, or a tablet device 482. The mobile computing device 450 may also be implemented as a component of a smart-phone, AR device, or other similar mobile device.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The subject matter and the actions and operations described in this specification can be implemented in digital electronic circuitry, in tangibly-embodied computer software or firmware, in computer hardware, including the structures disclosed in this specification and their structural equivalents, or in combinations of one or more of them. The subject matter and the actions and operations described in this specification can be implemented as or in one or more computer programs, e.g., one or more modules of computer program instructions, encoded on a computer program carrier, for execution by, or to control the operation of, data processing apparatus. The carrier can be a tangible non-transitory computer storage medium. Alternatively or in addition, the carrier can be an artificially-generated propagated signal, e.g., a machine-generated electrical, optical, or electromagnetic signal, which is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program can be written in any form of programming language, including compiled or interpreted languages, or declarative or procedural languages; and it can be deployed in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

This specification uses the term "configured to" in connection with systems, apparatus, and computer program components. That a system of one or more computers is configured to perform particular operations or actions means that the system has installed on its software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this by itself should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    receiving, as an input to a machine-learning model, data indicative of user-interaction of a particular user with a generative artificial intelligence (AI) system, the machine learning model being trained to identify one or more topics associated with inputs provided to the machine-learning model;
    identifying, by the machine-learning model based on the input, a first context associated with the data indicative of the user-interaction with the generative AI system;
    parsing a file system accessible to the machine-learning model to determine that one or more folders within the file system correspond to the first context, the file system comprising multiple folders each corresponding to a separate topic as identified by the machine-learning model from historical interactions of the particular user with the generative AI system, wherein each of the one or more folders stores information related to the corresponding topic as extracted by the machine-learning model from corresponding portions of the historical interactions;
    in response to determining that the one or more folders within the file system correspond to the first context, augmenting the data indicative of the interaction based on corresponding information from the one or more folders to generate an augmented prompt for the generative AI system; and
    providing the augmented prompt to the generative AI system for the generative AI system to generate a response to the interaction.

2. The method of claim 1, further comprising:
    receiving, as a feedback to the machine-learning model, a portion of the response generated by the generative AI system;
    identifying, by the machine-learning model based on the feedback, a second context associated with the response; and
    storing information extracted from the portion of the response in a corresponding folder for the second context within the file system.

3. The method of claim 2, wherein storing the information in the corresponding folder for the second context comprises:
    determining that the file system includes a particular folder for a context that substantially matches the second context; and
    identifying the particular folder as the corresponding folder for the second context.

4. The method of claim 2, wherein storing the information in the corresponding folder for the second context comprises:
   determining that the file system does not include a folder for a context which substantially matches the second context; and
   in response to determining that the file system does not include a folder for a context which substantially matches the second context, creating a new folder within the file system as the corresponding folder for the second context.

5. The method of claim 1, wherein the file system is configured to store the historical interactions corresponding to a predetermined time window.

6. The method of claim 1, further comprising:
   receiving user-input indicative of particular interest in a portion of the response generated by the generative AI system;
   identifying, by the machine-learning model based on the user-input, a second context associated with the response; and
   storing information extracted from the portion of the response in a corresponding folder for the second context within the file system.

7. The method of claim 1, further comprising:
   receiving user-input indicative of lack of interest in a portion of the response generated by the generative AI system;
   identifying, by the machine-learning model based on the response, a second context associated with the response; and
   storing information extracted from the response in a corresponding folder for the second context within the file system, the stored information being indicative of the lack of interest in the portion as represented in the user-input.

8. The method of claim 7, wherein the stored information excludes information pertaining to the portion of the response.

9. The method of claim 7, wherein the stored information includes an indication of the lack of interest in the portion of the response.

10. The method of claim 1, wherein augmenting the data indicative of the interaction based on corresponding information from the one or more folders to generate an augmented prompt for the generative AI system comprises:
   using a script to extract the corresponding information from the one or more folders;
   providing the corresponding information and data indicative of the interaction to a second generative AI system using an application programming interface (API); and
   generating, by the second generative AI system, the augmented prompt based on the corresponding information and data indicative of the interaction.

11. The method of claim 10, wherein the second generative AI system is the same as the generative AI system.

12. The method of claim 1, wherein augmenting the data indicative of the interaction based on corresponding information from the one or more folders to generate an augmented prompt for the generative AI system comprises:
   adding to the data indicative of the interaction a description of one or more historical interactions of the particular user with the generative AI system, wherein the one or more historical interactions are related to the first context identified by the machine learning model.

13. The method of claim 1, wherein:
   one or more folders of the file system stores data related to characteristics of the particular user; and
   augmenting the data indicative of the interaction based on corresponding information from the one or more folders to generate an augmented prompt for the generative AI system comprises adding to the data indicative of the interaction the data related to characteristics of the particular user.

14. One or more non-transitory machine-readable storage devices storing machine-readable instructions configured to cause one or more processing devices to perform operations comprising:
   receiving, as an input to a machine-learning model, data indicative of user-interaction of a particular user with a generative artificial intelligence (AI) system, the machine learning model being trained to identify one or more topics associated with inputs provided to the machine-learning model;
   identifying, by the machine-learning model based on the input, a first context associated with the data indicative of the user-interaction with the generative AI system;
   parsing a file system accessible to the machine-learning model to determine that one or more folders within the file system correspond to the first context, the file system comprising multiple folders each corresponding to a separate topic as identified by the machine-learning model from historical interactions of the particular user with the generative AI system, wherein each of the one or more folders stores information related to the corresponding topic as extracted by the machine-learning model from corresponding portions of the historical interactions;
   in response to determining that the one or more folders within the file system correspond to the first context, augmenting the data indicative of the interaction based on corresponding information from the one or more folders to generate an augmented prompt for the generative AI system; and
   providing the augmented prompt to the generative AI system for the generative AI system to generate a response to the interaction.

15. The one or more non-transitory machine-readable storage devices of claim 14, wherein the operations further comprise:
   receiving, as a feedback to the machine-learning model, a portion of the response generated by the generative AI system;
   identifying, by the machine-learning model based on the feedback, a second context associated with the response; and
   storing information extracted from the portion of the response in a corresponding folder for the second context within the file system.

16. The one or more non-transitory machine-readable storage devices of claim 15, wherein storing the information in the corresponding folder for the second context comprises:
   determining that the file system includes a particular folder for a context that substantially matches the second context; and
   identifying the particular folder as the corresponding folder for the second context.

17. The one or more non-transitory machine-readable storage devices of claim 15, wherein storing the information in the corresponding folder for the second context comprises:

determining that the file system does not include a folder for a context which substantially matches the second context; and in response to determining that the file system does not include a folder for a context which substantially matches the second context, creating a new folder within the file system as the corresponding folder for the second context.

18. The one or more non-transitory machine-readable storage devices of claim 14, wherein augmenting the data indicative of the interaction based on corresponding information from the one or more folders to generate an augmented prompt for the generative AI system comprises:

using a script to extract the corresponding information from the one or more folders;

providing the corresponding information and data indicative of the interaction to a second generative AI system using an application programming interface (API); and generating, by the second generative AI system, the augmented prompt based on the corresponding information and data indicative of the interaction.

19. The one or more non-transitory machine-readable storage devices of claim 14, the operations further comprising:

receiving user-input indicative of particular interest in a portion of the response generated by the generative AI system;

identifying, by the machine-learning model based on the user-input, a second context associated with the response; and storing information extracted from the portion of the response in a corresponding folder for the second context within the file system.

20. The one or more non-transitory machine-readable storage devices of claim 14, further comprising:

receiving user-input indicative of lack of interest in a portion of the response generated by the generative AI system;

identifying, by the machine-learning model based on the response, a second context associated with the response; and storing information extracted from the response in a corresponding folder for the second context within the file system, the stored information being indicative of the lack of interest in the portion as represented in the user-input.

21. A system comprising:

memory configured to store machine-readable instructions; and one or more processing devices configured to execute the machine-readable instructions to perform operations comprising:

receiving, as an input to a machine-learning model, data indicative of user-interaction of a particular user with a generative artificial intelligence (AI) system, the machine learning model being trained to identify one or more topics associated with inputs provided to the machine-learning model, identifying, by the machine-learning model based on the input, a first context associated with the data indicative of the user-interaction with the generative AI system, parsing a file system accessible to the machine-learning model to determine that one or more folders within the file system correspond to the first context, the file system comprising multiple folders each corresponding to a separate topic as identified by the machine-learning model from historical interactions of the particular user with the generative AI system, wherein each of the one or more folders stores information related to the corresponding topic as extracted by the machine-learning model from corresponding portions of the historical interactions, in response to determining that the one or more folders within the file system correspond to the first context, augmenting the data indicative of the interaction based on corresponding information from the one or more folders to generate an augmented prompt for the generative AI system, and providing the augmented prompt to the generative AI system for the generative AI system to generate a response to the interaction.

\* \* \* \* \*